United States Patent Office 3,328,347
Patented June 27, 1967

3,328,347
NITRILE-CONTAINING ORGANOSILICON
POLYMERS
Christian R. Sporck, Burnt Hills, N.Y., assignor to General Electric Company, a corporation of New York
No Drawing. Filed Dec. 18, 1961, Ser. No. 160,271
4 Claims. (Cl. 260—46.5)

This invention relates to cyclic polydiorganosiloxanes containing nitrile groups attached to silicon through carbon and to polymers prepared therefrom.

Heretofore, a number of cyclic polydiorganosiloxanes and polymers prepared therefrom have been known in the art. These polymers have been useful in the preparation of silicone rubbers which have found extensive use in many applications. While presently known silicone rubbers are quite satisfactory for many applications, these rubbers have been deficient in one or more properties. Thus, in some cases tensile strength has been lower than desired, in other cases resistance to the effects of ionizing radiation has been poor, in other cases resistance to the swelling effect of hydrocarbon solvents has been unsatisfactory, and in still other cases the thermal stability has not been as high as desired.

The present invention is based on my discovery of a new class of cyclic polydiorganosiloxanes and to high molecular weight linear polydiorganosiloxanes prepared therefrom. These high molecular weight materials exhibit the combination of higher tensile strength, increased radiation resistance, improved solvent resistance, and improved thermal stability as compared with conventional silicone rubber.

The cyclic polydiorganosiloxanes of the present invention have the formula:

(1)

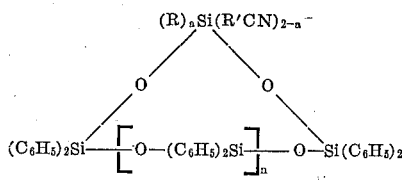

where R is a monovalent hydrocarbon radical or a halogenated monovalent hydrocarbon radical, R' is a divalent hydrocarbon radical free of aliphatic unsaturation, $a$ and $n$ are whole numbers equal to from 0 to 1, inclusive, the nitrile radical being attached to silicon through at least two carbon atoms.

The high molecular weight polymeric materials of the present invention contain a plurality of units having the formula:

(2) $-C_6H_5)_2SiO-(C_6H_5)_2Si]_nO-$
$Si(C_6H_5)_2-O-(R)_a(R'CN)_{2-a}Si-O-$ where R and R' and $a$ and $n$ are as previously defined. These polymeric materials can consist essentially of the structural units of Formula 2 or can contain both the structural units of Formula 2 as well as structural units derived from other cyclic polydiorganosiloxanes.

Among the radicals represented by R of Formulae 1 and 2 can be mentioned, for example, alkyl radicals, e.g., methyl, ethyl, propyl, octyl, octadecyl, etc. radicals; cycloalkyl radicals, e.g., cyclohexyl, cycloheptyl, etc. radicals; aryl radicals, e.g., phenyl, naphthyl, tolyl, xylyl, etc. radicals; aralkyl radicals, e.g., benzyl, phenyl ethyl, etc. radicals; alkenyl radicals, e.g., vinyl, allyl, etc. radicals; and halogenated derivatives of the above radicals, e.g., chloromethyl, bromophenyl, etc. radicals. Among the divalent hydrocarbon radicals represented by R' of Formulae 1 and 2 are included, for example, arylene radicals such as p-phenylene, m-phenylene, naphthylene, etc. radicals and alkylene radicals, e.g., ethylene, propylene, etc. radicals. The preferred class of radicals within the scope of R' are the divalent alkylene radicals which result in a cyanoalkyl radical having the formula:

(3) $-(CH_2)_bCN$ attached to silicon, where $b$ is an integer equal to at least 2, and preferably from 2 to 3, inclusive. Specifically, the nitrile-containing radical is preferably a beta-cyanoethyl radical or a gamma-cyanopropyl radical.

Among the cyclopolysiloxanes within the scope of Formula 1 can be mentioned, for example, 1-methyl-1-beta-cyanoethyl - 3,3,5,5 - tetraphenylcyclotrisiloxane, the preferred cyclic material within the scope of the present invention, as well as 1-methyl-1-beta-cyanoethyl-3,3,5,5,7,7-hexaphenylcyclotetrasiloxane; 1,1-bis(beta-cyanoethyl)-3,3,5,5-tetraphenylcyclotrisiloxane; 1-(p-cyanophenyl)-1,3,3,5,5,7,7-heptaphenylcyclotetrasiloxane; etc.

The cyclopolysiloxanes within the scope of Formula 1 are prepared by effecting reaction between a hydroxy chain-stopped polydiphenylsiloxane having the formula:

(4) $HO-(C_6H_5)_2SiO-(C_6H_5)_2Si]_nO-(C_6H_5)_2Si-OH$ where $n$ is as previously defined, and a diorganodihalogenosilane having the formula:

(5) $(R)_a(NCR')_{2-a}SiX_2$ where R, R' and $a$ are as previously defined and X is halogen, preferably chlorine. In preparing the preferred cyclopolysiloxane of the present invention, methyl-beta-cyanoethyldichlorosilane is reacted with tetraphenyldisiloxanediol-1,3.

It is apparent that Formula 4 encompasses two compounds, namely, tetraphenyldisiloxanediol-1,3 and hexaphenyltrisiloxanediol-1,5. It is also apparent that many diorganodihalogenosilanes are encompassed within the scope of Formula 5. Illustrative of these many compounds are, for example, methyl-beta-cyanoethyldichlorosilane, bis(beta-cyanoethyl)dichlorosilane, phenyl-gamma-cyanopropyldichlorosilane, bis(gamma-cyanopropyl)dichlorosilane, phenyl - p-cyanophenyldichlorosilane, etc.

The diorganodihalogenosilanes within the scope of Formula 5 as well as the hydroxy chain-stopped diphenylpolysiloxanes of Formula 4 are known in the art. For example, many of the diorganodihalogenosilanes within the scope of Formula 5 are described in Patents 2,971,-970—Bluestein and 2,911,426—Jex et al.

The reaction to form the cyclic polydiorganosiloxane of Formula 1 involves one mole of the hydroxy chain-stopped material of Formula 4 and one mole of the diorganodihalogenosilane of Formula 5 and results in the formation of two moles of hydrogen halide. To facilitate the reaction, a tertiary amine hydrogen halide acceptor such as pyridine, triethyl amine, etc. is employed. In theory, one mole of the hydrogen halide acceptor is required for each mole of hydrogen halide generated. While the theoretical ratio of reactants have been described above, the ratio of these ingredients can vary within wide limits. For example, the hydroxy chain-stopped polydiphenylsiloxane of Formula 4 can be employed in an amount equal to from about 0.5 to 2 moles per mole of the diorganodihalogenosilane of Formula 5. Preferably, the hydrogen halide acceptor is employed in excess, with there being from about 3 to 30 moles of hydrogen halide acceptor per mole of whichever of the other two reactants is present in the smaller amount. While these ratios of ingredients can vary as described above, it is preferred to effect reaction between equimolar amounts of the hydroxyl chain-stopped diphenylpolysiloxane of Formula 4 and the diorganodihalogenosilane of Formula 5. Since the reaction between these two reactants is essentially quantitative, the use of an equimolar mixture of these reactants simplifies the isolation of the desired cyclopolysiloxane of Formula 1 from the reaction mixture.

Because the hydroxyl chain-stopped polydiphenylsiloxanes of Formula 3 and the cyclic polydiorganosiloxanes of Formula 1 are solid materials at room temperature, it is preferable to effect the reaction in the presence of a solvent which is inert to the reactants under the conditions of the reaction and which is a solvent for all of the reactants and reaction products except the product resulting from the hydrogen halide and the halogen halide acceptor. Suitable solvents include diethyl ether, tetrahydrofran, tetrahydropyran, n-hexane, xylene and toluene. In general, the solvent is employed in the ratio of from about 1 to 50 parts by weight based on the total weight of the other components of the reaction mixture.

Because the reaction to form the cyclic polydiorganosiloxane of Formula 1 proceeds at a satisfactory rate at room temperature, it is preferred to conduct the reaction at such temperature, i.e., a temperature of from about 15 to 25° C. However, it should be understood that the use of elevated temperatures, e.g., temperatures of from about 25 to 120° C. is not precluded. Depending upon the proportions of reactants, reaction temperature and the particular solvent employed, the time required for effecting the reaction of the present invention can vary from about 1 hour to 24 hours or more.

After the reaction is completed, the reaction mixture consists of a solution of the desired cyclic polydiorganosiloxane of Formula 1 together with any unreacted starting materials, and a precipitate of a material such as pyridine hydrochloride. This precipitate is filtered from the reaction mixture and the resulting filtrate is stripped of solvent and volatile starting materials resulting in a solid product. This crude product is recrystallized from a suitable solvent such as benzene, n-hexane, n-butanol or a mixture of these materials or a mixture of ethanol and cyclohexane to produce the purified cyclic polydiorganosiloxane of Formula 1.

Polymeric materials consisting essentially of the recurring unit of Formula 2 can be formed by the homopolymerization of the cyclic polydiorganosiloxane of Formula 1 by several methods. For example, the cyclic material can be polymerized by heat alone by maintaining this material at a temperature of about 300 to 375° C., preferably in an inert atmosphere such as nitrogen or a noble gas, for about 0.1 to 2 hours, during which time the cyclopolysiloxane ring opens up and rearranges and condenses to form a high polymer which is a tough, transparent gum soluble in benzene and toluene. This homopolymer gum can contain from about 15 to 1500 or more and preferably from about 70 to 1500 or more of the units of Formula 2, depending upon the reaction temperature and time. In general, these gums have an intrinsic viscosity of the order of from about 0.20 to 4 or more and preferably from 0.22 to 4 or more deciliters per gram and have a molecular weight of the order of at least about 10,000 and preferably from 50,000 to 5,000,000 or more.

Another and preferred method of forming the homopolymers of the present invention is by the catalytic rearrangement and condensation of the cyclic polydiorganosiloxanes of Formula 1. This rearrangement and condensation is effected in the presence of a typical alkaline organopolysiloxane rearrangement and condensation (polymerization) catalyst, such as potassium hydroxide. The rearrangement and condensation catalyst is conveniently added to the organopolysiloxane as a solution in octamethylcyclotetrasiloxane, for example, as a solution contaning from about 0.1 to 1% by weight potassium hydroxide. In general, the amount of potassium hydroxide employed should be sufficient to provide from about 10 to 100 parts potassium hydroxide per million parts by weight of the cyclic material. The catalytic polymerization is best effected by heating the cyclic material at the temperature above its melitng point and then adding the catalyst. In general, polymerization is effected at a temperature of from about 110 to 170° C. with polymerization being completed in a time of from a few seconds up to 1 hour or more. The gum resulting from this base catalyzed homopolymerization is identical to the gum produced by the thermal homopolymerization previously described.

One especially unique feature of the linear polydiorganosiloxane homopolymers of the present invention is that they are ordered polymers having a predetermined, high ratio of diphenylsiloxane units to nitrile-containing siloxane units with the nitrile-containing siloxane units being regularly spaced from each other by either two or three diphenylsiloxane units, depending upon whether the starting material is a cyclotrisiloxane or cyclotetrasiloxane. The effect of the high phenyl content and order is best demonstrated by the high tensile strength and elongation found in silicone rubber prepared from these homopolymers by methods which will be hereinafter described. These silicone rubbers have tensile strengths of from 500 to 2000 p.s.i. even in the unfilled state as compared with tensile strengths of 100 p.s.i. or less found in unfilled methyl silicone rubber. On the other hand, high molecular weight polydiphenylsiloxanes or copolymers with high phenyl content and large blocks of diphenylsiloxane units are hard, intractable materials with very little utility in the preparation of silicone rubber.

In addition to forming homopolymers of the cyclic polydiorganosiloxanes of Formula 1, copolymers can be prepared by reacting the cyclic polydiorganosiloxane with other cyclic polydiorganosiloxanes. Preferably, in preparing these copolymers, the base catalyzed rearrangement and condensation reaction described above is employed.

Suitable cyclic polydiorganosiloxane for copolymerizing with the cyclic diorganopolysiloxanes of Formula 1 include, for example, octamethylcyclotetrasiloxane, hexaphenylcyclotrisiloxane or octaphenylcyclotetrasiloxane; 1,1 - dimethyl - 3,3,5,5-tetraphenylcyclotrisiloxane which are described and claimed in my copending application, Ser. No. 160,264, now abandoned; 1,1-dimethyl-3,3,5,5,7,7-hexaphenylcyclotetrasiloxane which is described and claimed in the copending application of Howard A. Vaughn, Ser. No. 160,267, now abandoned; triphenylsiloxy pentaphenylcyclotrisiloxane or triphenylsiloxy heptaphenylcyclotetrasiloxane which are described and claimed in my copending application, Ser. No. 160,263; vinylpentaphenylcyclotrisiloxane or vinylheptaphenylcyclotetrasiloxane which are described and claimed in my copending application, Ser. No. 160,268; 1-methyl-1-vinyl-3,3,5,5-tetraphenylcyclotrisiloxane or 1-methyl-1-vinyl-3,3,5,5,7,7-hexaphenylcyclotetrasiloxane which are described and claimed in my copending application, Ser. No. 160,269; compounds such as chlorophenylpentaphenylcyclotrisiloxane or 1,1-bis(p-chlorophenyl)3,3,5,5,7,7-hexaphenylcyclotetrasiloxane which are described and claimed in my copending application, Ser. No. 160,265; methylpentaphenylcyclotrisiloxane and methylheptaphenylcyclotetrasiloxane which are described in my copending application, Ser. No. 160,270; compounds such as p-trifluorophenylpentaphenylcyclotrisiloxane which are described and claimed in my copending application, Ser. No. 160,272; and cyclic materials containing both siloxane linkages and silphenylene linkages which are described and claimed in my copending application, Ser. No. 160,-262. All of the aforementioned copending applications are filed concurrently herewith and assigned to the same assignee as the present invention.

The copolymerization of the cyclic polydiorganosiloxanes of Formula 1 with the aforementioned other cyclic polydiorganosiloxanes results in high molecular weight polysiloxane gums which are tough, clear materials and which are soluble in solvents such as benzene and toluene. When copolymeric organopolysiloxanes are prepared by copolymerizing the cyclic polydiorganosiloxanes of Formula 1 with other cyclic polydiorganosiloxanes, the procedure employed is identical to that employed in preparing the homopolymers within the scope of the present invention. The ratio of the various cyclic polydiorganosiloxanes used in the preparation of the linear copolymers can vary without limit, for example, from 1 to 99 percent by weight of the cyclic material of Formula 1 in the mixture of the various cyclic materials, depending upon the characteristics desired in the final copolymeric material.

All of the homopolymers consisting of the repeating unit of Formula 2 as well as all of the copolymers containing the repeating unit of Formula 2 together with other polydiorganosiloxane units can be cross-linked in either the filled or unfilled state. Because of the high phenyl content of the homopolymers of my invention, free radical catalyst cross-linking is generally not satisfactory. Rather, the cross-linking is effected by ionizing radiation, preferably by high energy electrons following the teachings of Patent 2,763,609—Lawton et al. Again, because of the high phenyl content of these homopolymers, larger doses of radiation are employed than are used for cross-linking methyl silicone gums. Satisfactory irradiation doses are from about $10 \times 16^6$ to $1000 \times 10^6$ roentgens, employing electrons having energies of from about 50,000 to 20,000,000 electron volts.

With many of the copolymers of the present invention, free radical catalyst cross-linking is also impractical because of the high phenyl content and high energy electron irradiation to the dose mentioned above is employed. However, when the copolymer contains at least about one vinyl group per hundred silicon atoms or more than about one pair of adjacent alkyl radical-containing silicon atoms per hundred silicon atoms, free radical catalyst cross-linking can be employed. Suitable free radical catalysts include the organoperoxides, for example, benzoyl peroxide, tertiary butyl perbenzoate, dichlorobenzoyl peroxide, di-alpha-cumyl peroxide, as well as other free radical generating materials such as zirconyl nitrate, etc. Where free radical catalysts are employed in the cross-linking, these catalysts are generally present in an amount equal to from about 1 to 10% by weight, based on the weight of the diorganopolysiloxane polymer. The catalyzed copolymer is cured to a rubber by heating at a temperature of about 125° C., in a mold if desired, for about 10 minutes followed by a post-cure at a temperature of about 200° C. for one hour.

Where fillers are employed in the silicone rubber, the fillers are generally present in an amount equal to from about 20 to 300 parts by weight per 100 parts by weight of the high molecular weight linear polydiorganosiloxane. Suitable fillers include the various silica fillers such as silica aerogel, fumed silica, precipitated silica as well as other types of fillers such as titanium dioxide, calcium silicate, ferric oxide, chromic oxide, cadmium sulfide, asbestos, glass fibers, calcium carbonate, carbon black, lithopone, talc, etc. Preferably, the filler employed in preparing the silicone rubber is a finely divided silica filler.

The silicone rubbers prepared as described above are useful in all of those applications where conventional silicone rubbers are useful and are particularly useful in those applications where high strength is required. Because of the high percentage of silicon-bonded phenyl groups in these polymers, the materials are also very useful in applications where resistance to irradiation is required. In addition, the presence of the nitrile group attached to silicon through carbon renders the polymeric materials more resistant to the swelling effect of paraffin hydrocarbon solvents than are silicone rubbers which do not contain polar groups. Because of this combination of properties, the polymers of the above invention are particularly useful as seals for automotive transmissions.

The following examples are illustrative of the practice of my invention and are not intended for purposes of limitation. All parts are by weight.

*Example 1*

To a solution of 8.4 parts of methyl-beta-cyanoethyldichlorosilane and 15 parts pyridine in 210 parts diethyl ether was added a solution of 20.7 parts of tetraphenyldisiloxanediol-1,3 in 70 parts diethyl ether. The resulting reaction mixture was stirred for two hours and allowed to stand for 16 hours at room temperature, during which time pyridine hydrochloride precipitated from the reaction mixture. This pyridine hydrochloride was removed by filtration and the solvent was removed by evaporation. This resulted in a solid material which was dissolved in hot toluene and the solution was filtered to remove a minor amount of pyridine hydrochloride which remained. The toluene was then removed by evaporation and the resulting solids were recrystallized from a mixture of 4 parts by volume of cyclohexane and 1 part by volume of ethanol. The resulting purified material was 1-methyl-1-beta-cyanoethyl-3,3,5,5-tetraphenylcyclotrisiloxane having the formula:

(6) 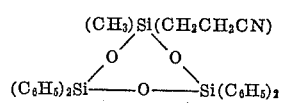

This white crystalline material had a melting point of 100.5 to 101.5° C. Infrared analysis revealed a doublet at 8.9 and a peak at 13.9 microns corresponding to the diphenylsiloxy unit; a peak at 9.8 microns corresponding to the trisiloxane ring; a peak at 7.9 microns corresponding to the methylsilyl group; and peaks at 4.45, 8.4, 11 and 11.3 corresponding to the beta-cyanoethylsilyl group. Chemical analysis showed the presence of 2.83% nitrogen as compared with the theoretical value of 2.75% N.

*Example 2*

Seven and one-half parts of the 1-methyl-1-beta-cyanoethyl-3,3,5,5-tetraphenylcyclotrisiloxane of Example 1 was heated to a temperature of about 120° C. and held at a pressure of about 10 microns to remove any entrained moisture or air. To the molten cyclic material was added 0.1 part of a 0.4% solution of potassium hydroxide in octamethylcyclotetrasiloxane and the catalyzed mixture was maintained at a temperature of about 120° C. for 15 minutes during which time the cyclic material polymerized to a tough, translucent gum consisting essentially of the following recurring structural units:

(7) 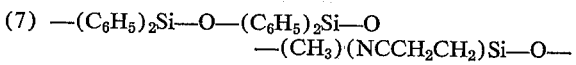

Infrared analysis of this polymeric material revealed a structure substantially identical to the structure of the cyclopolysiloxane of Example 1 except that the absorption peak characteristic of the cyclotrisiloxane unit was no longer present. This polymeric material is converted to a silicone rubber by milling one part of the material with 0.4 part of a finely divided precipitated silica and subjecting the milled material to a dose of $100 \times 10^6$ roentgens with electrons having energies of 800,000 kilo volts peak. The resulting rubber has a high tensile strength and elongation and is resistant to the swelling effect of hydrocarbon solvents and exhibits outstanding thermal stability.

*Example 3*

Following the procedure of Example 1, gamma-cyanopropylheptaphenylcyclotetrasiloxane having the formula:

(8) 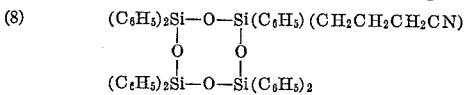

is prepared by reacting one mole of phenyl-gamma-cyano propyldichlorosilane with one mole of hexaphenylcyclotrisiloxanediol-1,5 in the presence of 5 moles of pyridine and 5 parts by weight of diethyl ether per part of the other components of the reaction mixture. Following the procedure of Example 2, one part of this cyclic material is mixed with 2 parts of hexaphenylcyclotrisiloxane, heated to a temperature of 150° C. and a sufficient amount of a 1% solution of potassium hydroxide in octamethylcyclotetrasiloxane is added to provide 50 parts per million potassium hydroxide per million parts of the two cyclopolysiloxanes. Within 30 minutes, a high molecular weight diorganopolysiloxane gum is formed which can be converted to a silicone rubber following the procedure of Example 2.

*Example 4*

Following the procedure of Example 3, 1-methyl-1-m-cyanophenylhexaphenylcyclotetrasiloxane having the formula:

(9) 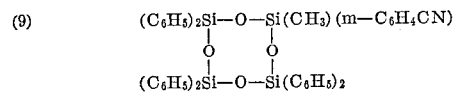

is prepared by effecting reaction between methyl-m-cyano phenyldichlorosilane and hexaphenyltrisiloxanediol-1,5. The resulting mixture is converted into a homopolymer by the procedure of Example 2 and the homopolymer is converted to a silicone rubber by the procedure of Example 2.

*Example 5*

Following the procedure of Example 3, 1,1-bis-(beta-cyanoethyl)-3,3,5,5-tetraphenylcyclotrisiloxane having the formula:

(10) 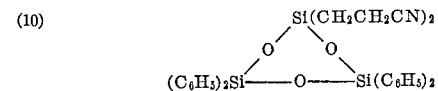

is prepared by effecting reaction between bis-(beta-cyanoethyl)dichlorosilane and tetraphenyldisiloxanediol-1,3. This cyclic material is converted into a homopolymer by the procedure of Example 2 and the homopolymer is then converted to a silicone rubber by mixing one part of the homopolymer with 0.4 part of precipitated silica and irradiating the resulting material to a dose of $100 \times 10^6$ roentgens with electrons having energies of 800,000 kilovolts peak.

What I claim as new and desire to secure by Letters Patent of the United States is:

1. A cyclic polydiorganosiloxane having the formula:

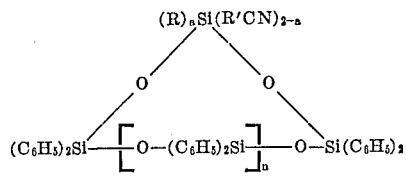

where R is a member selected from the class consisting of monovalent hydrocarbon radicals and halogenated monovalent hydrocarbon radicals, R' is a member selected from the class consisting of divalent arylene radicals and divalent alkylene radicals having at least two carbon atoms, the nitrile group being attached to silicon through at least two carbon atoms, and $a$ and $n$ are whole numbers equal to from 0 to 1, inclusive.

2. 1 - methyl - 1 - beta - cyanoethyl - 3,3,5,5 - tetraphenylcyclotrisiloxane.

3. A linear polydiorganosiloxane consisting essentially of the following recurring structural units:

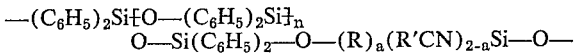

where R is a member selected from the class consisting of monovalent hydrocarbon radicals and halogenated monovalent hydrocarbon radicals, R' is a member selected from the class consisting of divalent arylene radicals and divalent alkylene radicals containing at least 2 carbon atoms, the nitrile radical being attached to silicon through at least 2 carbon atoms, and $a$ and $n$ are whole numbers equal to from 0 to 1, inclusive, said linear polydiorganopolysiloxane having a molecular weight of at least about 10,000.

4. A linear polydiorganosiloxane consisting essentially of the following recurring structural units:

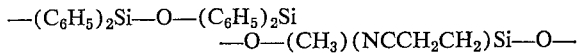

and having a molecular weight of at least about 10,000.

References Cited

UNITED STATES PATENTS

| | | | |
|---|---|---|---|
| 2,684,379 | 7/1954 | Guillissen et al. | 260—448.2 |
| 2,780,636 | 2/1957 | Wright et al. | 260—448.2 |
| 2,954,391 | 9/1960 | Riley et al. | 260—448.2 |
| 2,975,154 | 3/1961 | Pepe | 260—448.2 |
| 2,991,266 | 7/1961 | Bluestein et al. | 260—448.2 |

FOREIGN PATENTS

| | | |
|---|---|---|
| 1,116,725 | 2/1956 | France. |
| 786,020 | 11/1957 | Great Britain. |

OTHER REFERENCES

Cahoy et al., "Jour. Organic Chemistry," vol. 26, June 1961, p. 2008–12.

Eaborn, "Organosilicon Compounds," Academic Press, Inc., New York publishers (1960), p. 237.

TOBIAS E. LEVOW, *Primary Examiner.*

HELEN M. McCARTHY, *Examiner.*

S. H. BLECH, J. G. LEVITT, *Assistant Examiners.*